Oct. 24, 1933.  E. L. GOLDNER  1,932,310
RIM LOCK FOR MOTOR VEHICLE WHEELS
Filed April 18, 1932  2 Sheets-Sheet 1
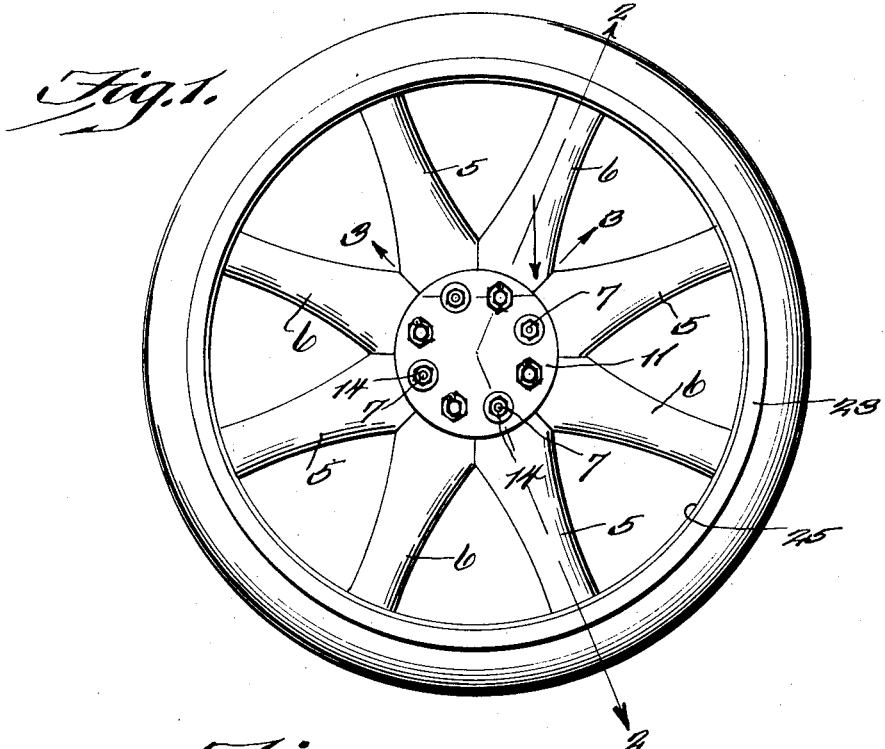
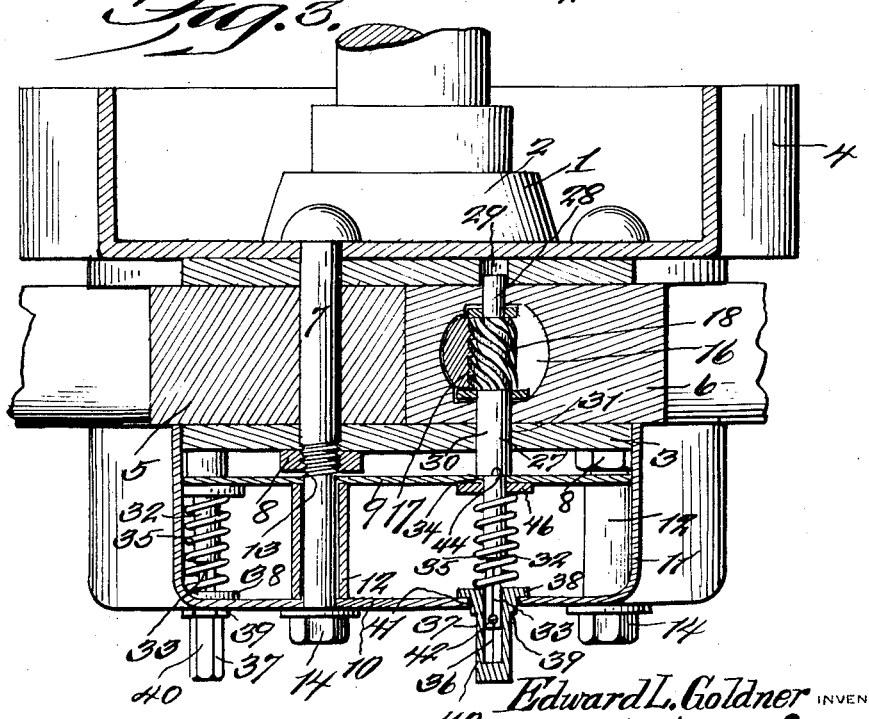
Edward L. Goldner INVENTOR
BY Victor J. Evans & Co.
ATTORNEYS

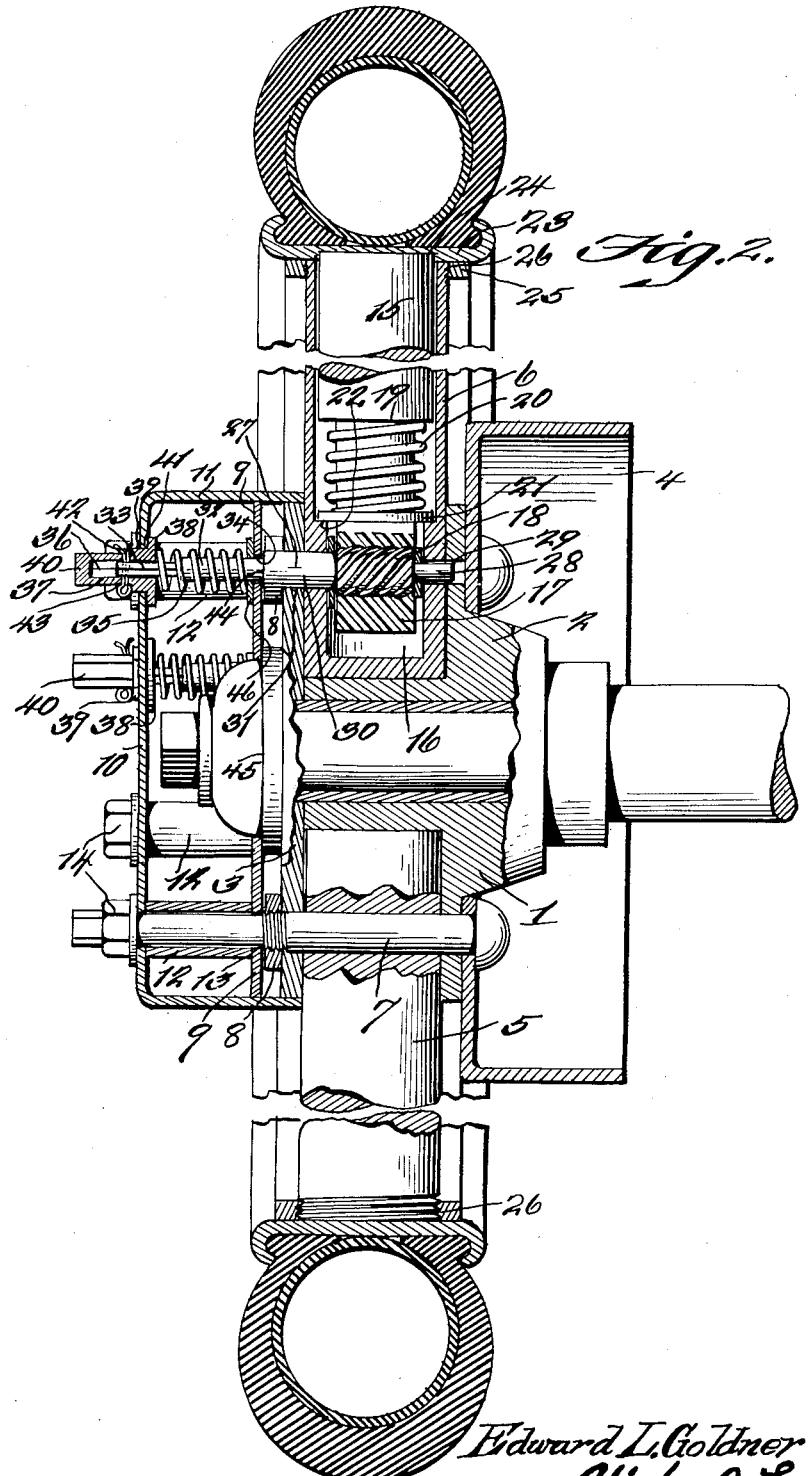

Patented Oct. 24, 1933

1,932,310

UNITED STATES PATENT OFFICE 1,932,310

RIM LOCK FOR MOTOR VEHICLE WHEELS

Edward Louis Goldner, Philadelphia, Pa.

Application April 18, 1932. Serial No. 606,033

1 Claim. (Cl. 301—16)

This invention relates to an improved rimlock for motor vehicle wheels, and the purpose of the invention is to provide a device of this kind which is relatively compact, simple and practical in construction and will eliminate the use of the ordinary lugs, which are now used on the old style demountable rims, also doing away with the non-demountable clincher type rims, from which tires are difficult to be removed.

With this type of rim lock there is no possibility of the rim becoming loose and finally falling off. By use of a suitable crank wrench the various parts of the lock automatically operate and engage radial movable elements quickly and easily into locked engagement with the rim, thereby holding the rim to the felly of the wheel with but little effort.

Another purpose is to provide a rim lock including radial movable elements in certain of the spokes of the wheel, each element being operated by an improved mechanism practically housed in the hub of the wheel for actuating each element to disengage it from the rim, and then operated in an outward radial direction to engage it with the rim, in combination with means for holding the parts of the hub together.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawings and claimed.

In the drawings:—

Figure 1 is a view in side elevation of a motor vehicle wheel constructed in accordance with the invention.

Figure 2 is a sectional view on line 2—2 through the hub structure, not only showing the means for operating the radially movable elements housed in certain of the spokes, but also showing the means for holding parts of the hub together.

Figure 3 is a sectional view on line 3—3 of Figure 1.

Referring to the drawings 1 identifies the hub of the wheel comprising the two sections 2 and 3, the section 2 being toward the inner face of the wheel and the section 3 adjacent the outer face of the wheel, while 4 identifies the brake drum. Arranged between the two sections 2 and 3 are the spokes of the wheel. Certain spokes 5 are solid, while certain other spokes 6 are tubular. The spokes are fastened between the two sections 2 and 3 by means of the bolts 7. The bolts 7 pass through the wall of the brake drum 4 through the walls of the two sections 2 and 3 and are arranged intermediate the tubular spokes 6. Threaded on the bolts 7 are nuts 8, and arranged adjacent the nuts 8 is a plate or disc 9, and between the disc 9 and the wall 10 of a hub housing 11 are sleeves 12, acting as spacing means between the disc or plate 9 and the outer wall of the hub housing 11. The fact is the disc 9 engages against the shoulder 13 where the bolts 7 are threaded. The outer extremities of the bolts 7 are reduced and threaded and have nuts 14, thereby clamping the several parts together.

As previously stated the spokes 6 are tubular, but where these fasten between the two hub sections, they are rectangular, and mounted for radial movement in the tubular spokes 6 are rim locking plungers 15. While the inner ends of the tubular spokes 6 are exteriorly rectangular, they are provided with cylindrical bores or chambers 16. The inner ends of the rim locking plungers are reduced and fit the chambers 16 for radial movement. The reduced inner ends of the locking plungers have flat faces which are toothed as shown at 17 for meshing engagement with the teeth of the worms 18. Between where the teeth 17 end and shoulders 19 on the rim locking plungers their reduced portions are cylindrical, and surrounding the plungers at this point are coil springs 20, which cooperate with the shoulders 19 and washers 21, which are carried by the inner reduced portions of the rim locking plungers and seat on shoulders 22 of the inner face of the bores of the spokes 6. The springs 20 act to assist in moving the locking plungers outwardly in engagement with the rim 23 of the wheel. In fact the rim 23 has sockets 24 with which the locking plungers engage, thereby holding the rim locked on a felly 25, to which the several spokes 5 and 6 are connected as shown at 26.

The pinions 18 are carried by rotating rods 27, the inner reduced ends 28 of which engage loosely in bearings 29, while the portions 30 of these rods rotate in bearings 31. The outer ends of the rods 27 are reduced at 32 and at 33, the reduced parts 32 passing through openings 34 in the disc or plate 9. Surrounding the reduced parts 32 of the rods 27 are coil springs 35. The reduced parts 33 of the rods 27 are rectangular in cross sectional area and fit into similar shaped sockets 36 of the rod rotating devices or nuts 37. These devices or nuts 37 have an annular flange 38 which contacts with the wall of the hub housing 10 to prevent outward movement of the devices or nuts when the parts are assembled. The devices or nuts 37 have polygonal shaped heads 39 and 40, the heads 39 engage openings 41 of the outer wall of the hub housing 9, while the polygonal head 40 may be engaged by a socket in a crank wrench (not shown). The polygonal heads 40 have transverse openings 43 which register with similar openings in the reduced ends 33 of the rods 27 for the reception of cotter pins 42, which will prevent detachment of the operating devices or nuts when the hub housing is removed. However as long as the hub housing remains in place the annular flange 38 will bear against the inner surface of the hub housing and in this instance it would be unnecessary to insert the cotter pins. The cotter pins are only inserted after the hub housing has been removed for the purpose of making repairs or supplying new parts. The springs 35 act to bear the flanges 38 of the rotating devices or nuts against the inner face of the wall of the hub housing. The reduced parts 32 of the rods 37 pass through the disc or plate 9, the shoulders 44 of the rods 27 being engaged by the inner face of the disc or plate 9. Also the disc or plate 9 engages against a shoulder 45 of the section 3 of the hub. Suitable washers 46 are carried by the reduced part 32 of the rods 27 and are interposed between the springs 35 and the disc or plate 9.

As long as the hub housing remains in position the spring 35 bears against the rod rotating device 37 and holds the flange 38 against the wall of the hub housing, with the polygonal head 39 engaged in the opening 41, and as long as the polygonal head engages in the opening 41 the rods 27 are prevented from rotating. However when the crank wrench is applied to the polygonal head 40, the wrench crank is pressed toward the hub, moving the rod rotating devices inwardly against the action of the spring 35, permitting the rod 27 to be rotated, and since the gear or pinion 18 is in engagement with the teeth 17 the locking plungers may be moved inwardly and outwardly.

The invention having been set forth, what is claimed is:

In a rim lock for motor vehicle construction, a hub comprising axially opposed hub sections, a felly, a rim to engage through spokes connected to the felly and having their inner radially disposed ends housed between the two hub sections, certain of the spokes being hollow, rim locking plungers mounted for radial movement in said hollow spokes, said rim having sockets, resilient means for assisting in moving the plungers radially outwardly to engage the outer ends in said sockets, a hub housing adjacent the outer side face of the outer hub section, means passing through the hub sections and through the housing for clamping said parts together, rotating elements mounted in bearings of the hub sections with their outer ends protruding through the outer face wall of the hub housing, said elements being geared to the plungers for moving them into and out of engagement with the sockets of the rim, members protruding through the outer face wall of the hub housing and having rectangular sockets receiving similarly shaped ends of the rotating elements, whereby said members when moved toward the hub and rotated, rotating movements are imparted to the rotating elements, said members having polygonal portions normally engaging similarly shaped openings in the outer face wall of the hub housing, tensioning means for said members, said members having reduced polygonal extensions to receive a wrench for rotating the same, and means to prevent the members from being moved inwardly against their tensioning means, thereby retaining the rotating elements locked.

EDWARD LOUIS GOLDNER.